United States Patent [19]

Friedline et al.

[11] Patent Number: 4,644,284
[45] Date of Patent: Feb. 17, 1987

[54] DISTRIBUTORLESS IGNITION SYSTEM INTERFACE FOR ENGINE DIAGNOSTIC TESTERS

[76] Inventors: James G. Friedline, 2606 Sexton, Howell, Mich. 48843; Leo G. Rich, 53233 Woodbridge, Rochester, both of Mich. 48063

[21] Appl. No.: 686,203
[22] Filed: Dec. 26, 1984
[51] Int. Cl.[4] .............................. G01L 3/26
[52] U.S. Cl. .................. 324/397; 324/384; 324/402; 364/431.12; 73/116
[58] Field of Search ............... 73/119 R, 119 A, 116; 364/431.05, 431.12; 324/397, 40 Z, 384, 385, 379, 378

[56] References Cited

U.S. PATENT DOCUMENTS

| | | | |
|---|---|---|---|
| 3,650,149 | 3/1972 | Howes | 324/384 |
| 3,788,129 | 1/1974 | Trussell | 324/397 |
| 3,940,977 | 3/1976 | Voross | 324/397 |
| 3,986,009 | 10/1976 | Fastaia | 324/384 |
| 4,125,894 | 11/1978 | Cashel | 324/384 |
| 4,267,569 | 5/1981 | Baumann | 324/379 |
| 4,291,383 | 9/1981 | Tedeschi | 324/384 |

Primary Examiner—Reinhard J. Eisenzopf
Assistant Examiner—Jose M. Solis
Attorney, Agent, or Firm—Allegretti, Newitt, Witcoff & McAndrews, Ltd.

[57] ABSTRACT

An ignition system interface for interposing an automotive combustion engine having a computer controlled ignition with an engine test analyzer. The interface receives timing signals from the ignition computer and generates modified timing based on command from the engine analyzer. Modified timing signals are transmitted to the coil ignition module which fires the spark plugs of the engine. The analyzer may command a shorting of the cylinder which causes the interface to modify the timing at the appropriate time for inhibiting a selected cylinder from firing. Secondary signals from the spark plugs are received by the interface and converted to a proper voltage waveform for recognition by the engine analyzer. The cylinder No. 1 is monitored by the interface and converted to a proper waveform for transmission to the analyzer.

19 Claims, 8 Drawing Figures

DISTRIBUTORLESS IGNITION SYSTEM INTERFACE FOR ENGINE DIAGNOSTIC TESTERS

BACKGROUND OF THE INVENTION

The present invention relates to an internal combustion engine analyzer and more particularly to an analyzer for use with a computer controlled coil ignition system.

The majority of automotive ignition systems utilize an ignition distributor to control the flow of current between the battery and the sparkplugs. Such distributors consist of a drive shaft with a breaker cam, an advance mechanism, a breaker plate with contact points and a condenser, rotor and cam. The drive shaft is gear driven by the engine cam shaft.

Recently, solid state ignition systems began to appear in automobiles. More particularly, computer controlled coil ignition systems have been developed to eliminate the need for a distributor to control the flow of current between the battery and the sparkplugs. An electromagnetic sensor consisting of a hall effect sensor, magnet and interrupt ring is utilized to monitor the crank shaft position of the engine. As the crank shaft turns, a signal is produced which gives the top center position of each piston. The crank signal is utilized to develop timing signal for actuating an electronic controlled coil to fire the spark plugs.

However, the advent of computer controlled coil ignition systems has resulted in problems with engine test analyzers which were designed for distributor-type engines. Conventional engine analyzers include monitoring equipment which is connected to the automotive engine to diagnose the engine's operating condition. The apparatus monitors firings of the spark plug for determining proper timing of plug firing. Also, the analyzer may inhibit firing of a selected cylinder for additional testing.

Such engine analyzers look to monitor negative secondary voltages coming from each of the spark plugs and are generally synchronized by separately monitoring the firing of the No. 1 spark plug. The analyzer assumes that the No. 1 spark plug is fired once ever six firings, for example, for a six cylinder engine.

A computer controlled coil ignition system, however, fires half of the spark plugs with a negative firing voltage and the other half with a positive firing voltage. Also, each spark plug is fired in both its compression mode and in its exhaust mode. Thus, the No. 1 cylinder plug is fired twice during the cycle of firing the six cylinders of the engine.

It would be highly desirable to have a separate addon apparatus which may be used with a pre-existing engine test analyzer for permitting the analyzer to test both distributor and distributor-less engines.

It is therefore an object of the present invention to provide an interface apparatus connectable to an engine analyzer when testing a computer controlled coil ignition engine which interface will convert monitored engine signals into signals similar to those monitored in a conventional distributor combustion engine.

It is a further object of the present invention to provide an interface apparatus connectable between an engine analyzer and a computer controlled coil ignition engine for translating information between the engine and the analyzer to provide proper diagnosis by the analyzer.

SUMMARY OF THE INVENTION

These and other objects of the invention are achieved in an ignition system interface which receives timing signals from the engine computer controlling the ignition system and which modifies such timing signals upon command of an engine analyzer prior to transmission of the timing signals to the coil ignition of the automotive system. In a preferred embodiment, secondary firing signals as well as a cylinder No. 1 signal is processed from engine signals for transmission to the analyzer.

DESCRIPTION OF THE PREFERRED EMBODIMENT

Figure 1:
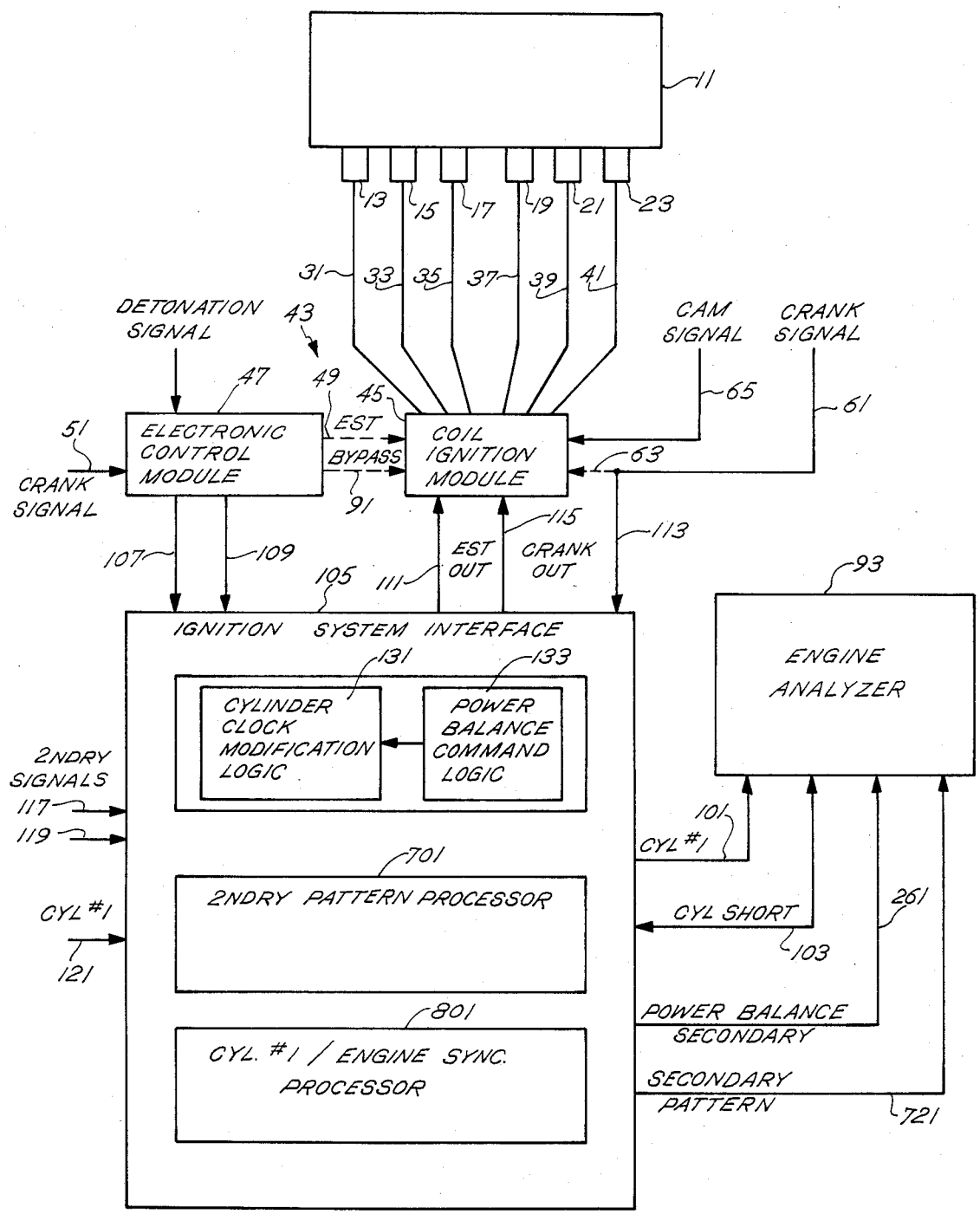
FIG. 1 is a block diagram of a computer controlled ignition engine and an engine analyzer in which a preferred embodiment of an ignition system interface of the present invention is connected between the engine and the analyzer.

Referring to FIG. 1, the embodiment of the invention shown herein may be used for the diagnosis of an engine, such as exemplary internal combustion engine 11. Engine 11 comprises six cylinders in which are fitted spark plugs 13 through 23.

The spark plugs are energized through wires 31 through 41, respectively, by a conventional computer controlled coil ignition system, generally indicated by reference numeral 43. The ignition system includes a computer controlled coil ignition module 45 which is connected to an electronic control module 47. Module 47 generates engine spark timing signals (primary signal) along a conductor 49 (shown in phantom) to the coil ignition module 45 which generates high voltage signals through wires 31 through 41 to the spark plugs.

Coil ignition module 45 also receives a CRANK signal along a conductor 61 (shown partially in phantom at 63) which serves as a fail-safe timing signal in the event of malfunction of control module 47. Depending on the type of engine, module 45 may also receive a cam signal along a conductor 65.

The CRANK signal appearing on conductor 61 is generated by a conventional crank sensor (not shown) which is mounted to the crank shaft. This sensor comprises a hall sensor, magnet and interrupter ring. As the crank shaft rotates, the CRANK signal on conductor 61 is generated to provide the top center position of each piston.

Coil ignition module 45 receives spark control timing information from the primary signal (EST) on conductor 49, in order to select and sequentially fire the sparkplugs at the proper crank position. Electronic control module 47 develops the EST signal based on the CRANK signal which is voltage-level modified prior to input at 51 to module 47. In the event of a malfunction in control module 47, the coil ignition module may use the CRANK signal directly to select and sequentially fire the sparkplugs at the proper crank position.

Figure 2:
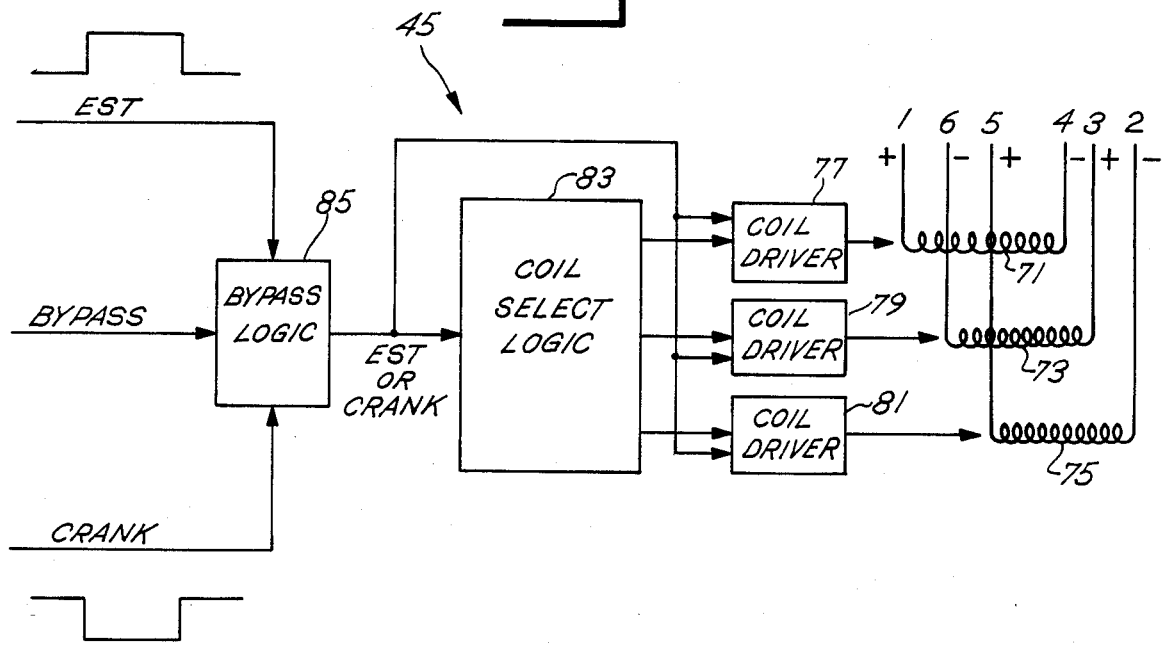
FIG. 2 is a block diagram of the coil ignition module of the engine of FIG. 1.

As shown schematically in FIG. 2, coil ignition module 45 includes three coils 71, 73, 75, each of which has two output wires connected to a respective pair of spark plugs. Coil 71 is connected, for example, to plugs of cylinders Nos. 1 and 4; coil 73 is connected to plugs of cylinders Nos. 3 and 6; and coil 75 is connected to plugs of cylinders Nos. 2 and 5.

Each coil is driven by a respective driver 77, 79, 81, which causes a pair of plugs to be fired simultaneously. One of the pair of plugs will fire during the compression stroke and the other of the pair of plugs will fire during the exhaust stroke. As understood, the firing of a plug in its exhaust stroke does not do anything. It is a wasted spark.

Cylinders 2, 4 and 6 are fired in a conventional fashion using a large negative voltage. However, cylinders 1, 3 and 5 are fired with a large positive voltage. The engine analyzers manufactured by the assignee of this application monitor negative voltage firings and not positive.

Coil ignition module 45 includes a coil select logic 83 which steps through each of the three coils in succession for synchronizing the firing of the spark plugs. The coil select logic is driven by either the EST or the CRANK signal. A bypass logic 85 decides whether the EST or the CRANK signal controls the firing of the coils, depending upon the state of a BYPASS signal.

Electronic control module 47 generates the BYPASS signal along a conductor 91 (shown in phantom in FIG. 1). When the BYPASS signal is logic HIGH, bypass logic 85 (FIG. 2) passes the EST signal to coil select logic 83 and to coil drivers 77, 79, 81 to control coil firing. When the bypass signal is logic LOW, the coil ignition module is instead run by the CRANK signal. This is a fail-safe, which permits the engine to be operated despite failure of the electronic control module 47.

The engine spark timing (EST) signal is a positive going signal as indicated in FIG. 2. The falling edge of the signal instructs coil select logic 83 to step to the next coil driver in sequence. The rising edge of the EST signal indicates the beginning of the coil charging or dwell. The falling edge of the EST signal will fire the appropriate coil via its coil driver.

The CRANK signal is a negative going signal as indicated in FIG. 2. Its falling edge indicates the beginning of the dwell period. The rising edge of the CRANK signal fires the selected coil and steps to the next coil.

Referring again to FIG. 1, a conventional Sun Electric model 2001 engine analyzer 93 is utilized to diagnose engine 11. Analyzer 93 is described in detail in U.S. Pat. No. 4,125,894 issued to Cashel et al. on Nov. 14, 1978. The Cashel patent is incorporated herein by reference to indicate the analyzer environment in which the preferred embodiment of the present invention is utilized.

Engine analyzer 93 includes a CYL No. 1 test lead 101 which is normally connected to the spark plug of cylinder No. 1 of a conventional distributor engine. Test lead 101 permits engine analyzer 93 to monitor the firing of the No. 1 cylinder. However, as mentioned previously, coil ignition module 45 fires the No. 1 cylinder at the time of compression of cylinder No. 1 and at the time of compression of cylinder No. 4. It also fires the No. 1 cylinder with a positive voltage instead of a negative voltage. Thus, the securing of test lead 101 directly to the No. 1 spark plug of engine 11 will not provide the correct information to engine analyzer 93.

Engine analyzer 93 also includes a CYL SHORT engine test lead 103. Usually, engine test lead 103 is connected to the primary signal input in the distributor. When engine analyzer 93 desires to short a cylinder, No. 5 for example, it waits until the cylinder preceeding the fifth cylinder has been fired and then shorts the primary by driving test lead 103 to ground. This prevents the coil of the conventional distributor from discharging to fire the plug. However, coil ignition module 45 must receive an EST signal in order to step to the next coil for firing to keep the system in synchronism. Thus, test lead 103 cannot be connected to the EST conductor 49 to prevent charging of the coil since it would also prevent the coil ignition module from sequencing to the next coil in the system for firing.

In order to provide proper operation of engine analyzer 93 in conjunction with an automotive engine having a computer controlled coil ignition system, an ignition system interface 105 is utilized. Interface 105 retrieves electrical signals from the engine, processes the signals and transmits them to the analyzer. Interface 105 also receives the CYL SHORT signal from analyzer 93 and responsively controls shorting of the proper cylinder while maintaining the synchronism of the coil ignition module 45.

In order to hook the interface up to the engine, conductors 49, 91 are disconnected from ignition module 45, and instead connected to interface 105, as shown by conductors 107, 109. The EST signal from module 47 is then transmitted to interface 105 over conductor 107 and the BYPASS signal from module 47 is transmitted to interface 105 over conductor 109. The EST signal is processed by the interface to form engine spark timing signals (EST OUT) for transmission to coil ignition module 45 via conductor 111, depending on the state of the BYPASS signal on conductor 109.

Also, conductor 61 is disconnected from the coil ignition module 45 (at location 63) and instead connected to interface 105, as shown by conductor 113. The CRANK signal is then transmitted to interface 105 over conductor 113. The CRANK signal is processed by the interface to form crank timing signals (CRANK OUT) for transmission to coil ignition module 45 via conductor 115.

Interface 105 also receives secondary signals from each plug wire along conductors 117, 119, and receives a cylinder No. 1 firing signal along conductor 121. These signals are processed by a secondary pattern process circuit 701 and a cylinder No. 1/engine sync processor 801, for developing appropriate outputs to analyzer 93, as discussed hereinafter.

Interface 105 includes a cylinder clock modification logic 131 which intercepts the EST signal from the electronic control module 47 and develops an engine spark timing signal (EST OUT). The developed EST signal (EST OUT) is fed to ignition module 45 via conductor 111. The dwell of the EST OUT is modified by command from a power balance command logic 133.

The EST OUT signal, when modified, will effectively kill the spark of the next cylinder firing while maintaining proper synchronization of ignition module 45.

Figure 3:
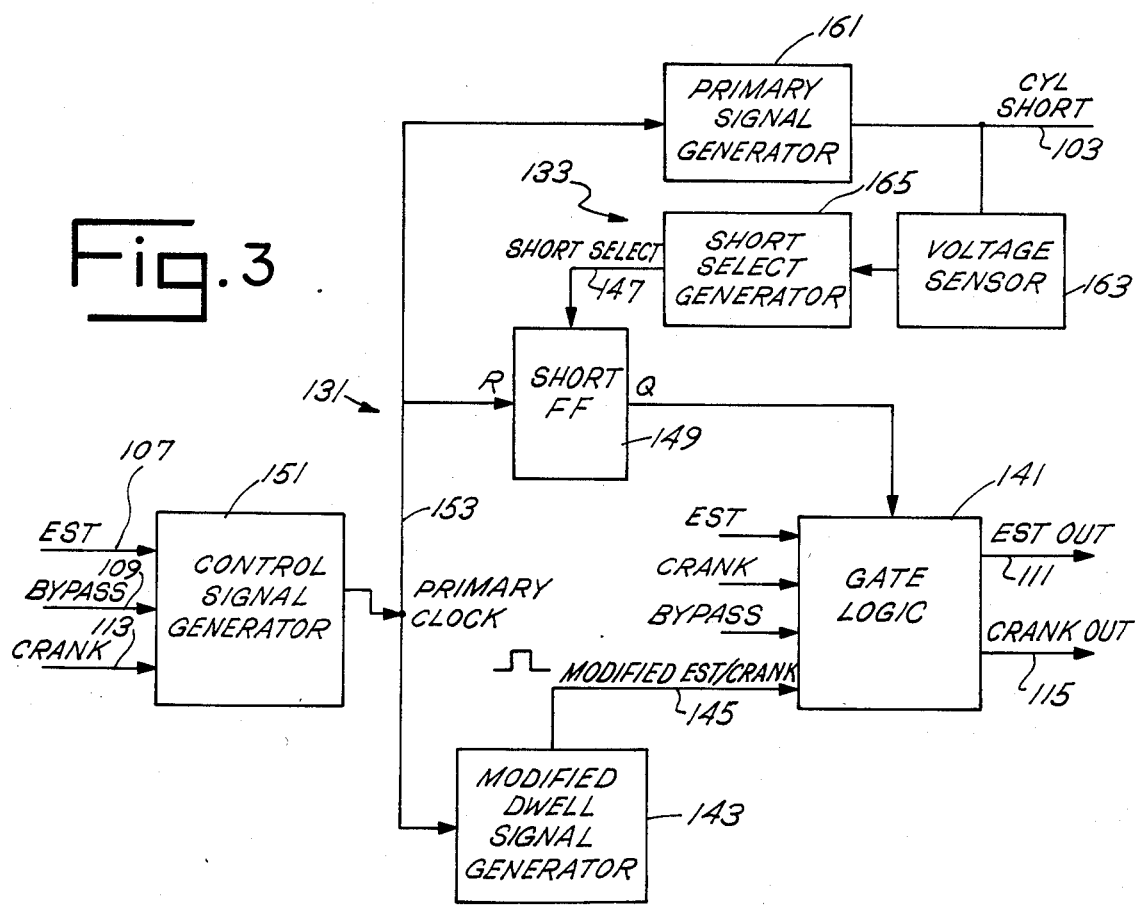
FIG. 3 is a block diagram of the cylinder clock modification logic and power balance command logic of the interface of FIG. 1.

Cylinder clock modification logic 131 and power balance command logic 133 are shown in greater detail in FIG. 3. Referring to FIG. 3, the EST, CRANK and BYPASS signals are received by a gate logic 141 for generating the EST OUT signal and the CRANK OUT signal which appear on respective conductors 111 and 115. Usually, gate logic circuit 141 passes the EST signal to the EST OUT conductor 111 when the BYPASS signal is HIGH, and passes the CRANK signal to the CRANK OUT conductor 115 when the BYPASS signal is LOW. However, in the event that analyzer 93 commands a shorting of a cylinder, gate logic circuit 141 passes a MODIFIED EST/CRANK signal onto one of the EST OUT or CRANK OUT conductors.

Power balance command logic 133 responds to a cylinder shorting command from analyzer 93 and generates a SHORT SELECT signal onto a conductor 147. The SHORT SELECT signal sets a flip flop 149 which generates an output signal Q indicating that the next cylinder firing is to be shorted. Gate logic 141 responds to the Q output from flip flop 149 and passes a MODIFIED EST/CRANK signal from a conductor 145 to either the EST OUT conductor 111 or the CRANK OUT conductor 115 depending upon the state of the BYPASS signal. The MODIFIED EST/CRANK signal developed on conductor 145 is generated by a modified dwell signal generator 143. The MODIFIED EST/CRANK signal is a pulse of short duration sufficient to step coil select logic 83 (FIG. 2) to a next coil but of insufficient duration (dwell) to charge coil 71, 73 or 75 to fire a plug.

Because flip flop 149 is set just prior to the firing of the particular coil selected to be shorted, the flip flop 149 must be reset prior to the next engine spark timing signal. A control signal generator 151 develops a control signal (PRIMARY CLOCK) on a conductor 153, which is used to reset flip flop 149. The control signal generator develops the PRIMARY CLOCK signal based on the leading edge of the EST or the CRANK signal. The PRIMARY CLOCK is also used to actuate modified dwell signal generator 143 to generate the MODIFIED EST/CRANK signal appearing on conductor 145.

Power balance command logic 133 generates the SHORT SELECT signal appearing on conductor 147 in response to command from engine analyzer 93 along the CYL SHORT lead 103. Engine analyzer 93 receives information as to the particular timing of the firing of each cylinder such that a shorting of the selected cylinder can be accomplished by analyzer 93 grounding the CYL SHORT lead 103 just prior to the firing of the particular cylinder selected to be inhibited from firing.

Engine analyzer 93 monitors the CYL SHORT lead for receiving a large 100 volt spike of the primary pattern just prior to shorting lead 103. A primary signal generator 161 is utilized to generate a fake primary pattern onto cylinder short lead 103. The PRIMARY CLOCK appearing on conductor 153 serves to actuate the primary signal generator 161 at the front edge of the EST or CRANK signal.

Figure 4:
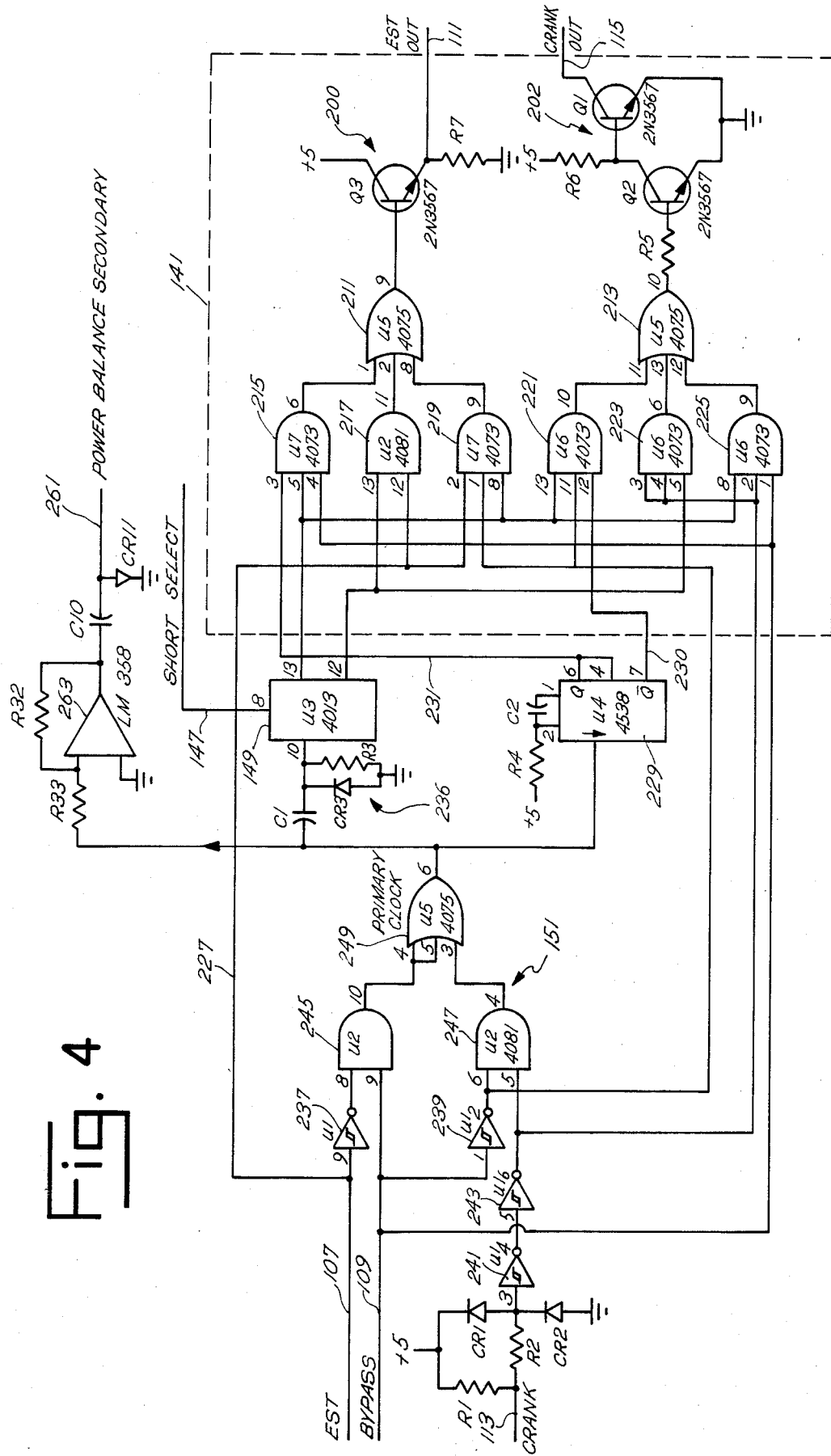
FIG. 4 is an electrical schematic diagram of the cylinder clock modification logic of FIG. 1.

When the engine analyzer 93 shorts CYL SHORT lead 103, a voltage sensor 163 recognizes the shorting of lead 103 and responsively actuates a SHORT SELECT generator 165 which in turn generates a SHORT SELECT pulse along conductor 147. Referring to FIG. 4, a preferred circuitry for cylinder clock Modification Logic 131 is shown.

Gate logic 141, which develops the EST OUT and the CRANK OUT signals includes a pair of OR gates 211, 213 which receive respective outputs of 6 AND gates 215 through 225. OR gate 211 permits either one of three signals to be passed as the EST OUT signal. The first signal is developed by AND gate 215 and is the MODIFIED EST/CRANK signal. The second signal is developed by AND gate 217 which merely gates the EST signal received from input conductor 107, when no cylinder shorting is to occur. The third signal is generated by AND gate 219 which merely gates the EST signal when the BYPASS signal appearing on conductor 109 is LOW. Since it does not matter what signal is fed onto conductor 111 when the BYPASS signal is LOW, the signal passed is the EST signal.

The CRANK OUT signal appearing on conductor 115 is generated in a similar fashion using AND gates 221, 223, 225 and OR gate 213. When the BYPASS signal appearing on input conductor 109 is LOW, the CRANK signal appearing on input conductor 113 is passed to CRANK OUT conductor 115. AND gates 221, 223, 225 serve to gate either the CRANK signal or the MODIFIED EST/CRANK signal onto CRANK OUT conductor 115.

The outputs of OR gates 211, 213 pass through driver circuits 200, 202 for driving the output on conductors 111, 115. Driver circuits 200, 202 include transistors Q1, Q2, Q3, resistors R5, R6, R7, connected as shown.

The EST signal from conductor 107 is fed via a conductor 227 to the input of AND gates 217, 219. The MODIFIED EST/CRANK signal is generated at the Q and $\overline{Q}$ output of a monostable multivibrator 229. The Q and $\overline{Q}$ output is a pulse signal of a duration established by resistor R4 and capacitor C2 as understood. This MODIFIED EST/CRANK signal is fed along conductor 231 to AND gate 215 and along conductor 230 to AND gate 221.

A flip flop 149 controls all six AND gates 215–225 to gate the MODIFIED EST/CRANK signal onto the EST OUT conductor 111 or the CRANK OUT conductor 115. Flip flop 149 is set by a SHORT SELECT pulse appearing on a conductor 147. Flip flop 149 is reset by the PRIMARY CLOCK signal via a reset network 236 comprising a capacitor C1, a diode CR3 and a resistor R3, connected as shown. After a cylinder has been inhibited from firing, the generation of the next EST signal serves to reset flip flop 149 via reset network 236.

The PRIMARY CLOCK is generated by control signal generator 151 comprised of inverters 237, 239, 241, 243, AND gates 245, 247, OR gate 249, diodes CR1, CR2, resistors R1, R2, connected as shown. The EST signal and BYPASS signal appearing on conductors 107, 109 are transmitted to inverter 237 and an AND gate 245. AND gate 245 passes an inverted EST signal whenever the BYPASS signal is HIGH.

Similarly, inverter 239 and AND gate 247 receive the BYPASS signal on conductor 109 and the CRANK signal appearing on conductor 113. AND gate 247 passes the CRANK signal whenever the BYPASS signal goes LOW. The CRANK signal is first voltage modified to the proper logic level by resistors R1, R2, diodes CR1, CR2 and inverters 241, 243.

The output of AND gates 245, 247 are fed to OR gate 249. The output of OR gate 249 is the PRIMARY CLOCK signal which indicates that a cylinder is to be fired. The PRIMARY CLOCK is utilized to activate monostable multivibrator 229 and to reset flip flop 149, as described above.

The PRIMARY CLOCK is also used to generate a POWER BALANCE SECONDARY signal to analyzer 93 via conductor 261. The POWER BALANCE SECONDARY signal is a fake clocking pulse applied to the analyzer when shorting a cylinder. An op amp 263, connected as shown to resistors R32, R33, buffers the PRIMARY CLOCK. A capacitor C10 differentiates the output of op amp 263 for generating a negative spike signal onto conductor 261.

When a cylinder is to be shorted in the power balance mode of the analyzer, the POWER BALANCE SECONDARY is input to the analyzer instead of the SECONDARY PATTERN signal, described hereinafter.

In operation, cylinder clock modification logic 131 works as follows. When the BYPASS signal is HIGH, the EST signal is passed through AND gate 217, OR gate 211, transistor driver 200 and onto conductor 111; also, the CRANK signal is passed through AND gate 223, OR gate 213, transistor driver 202 and onto conductor 115. When the power balance command logic 133 commands the shorting of a cylinder, a SHORT SELECT pulse sets flip flop 149 which serves to close AND gates 217, 223 and open AND gates 215, 221. Closing of AND gates 217, 223 prevents the EST signal and the CRANK signal from passing onto conductors 111, 115. The opening of AND gates 215, 221 serves to gate the MODIFIED EST/CRANK signal onto either conductor 111, 115 depending on the state of the BYPASS signal. If bypass conductor 109 goes LOW, then the MODIFIED EST/CRANK signal is passed via AND gate 221 and either gate 217 or gate 219 passes the EST signal onto EST OUT conductor 111 in accordance with the state of flip flop 233. If bypass conductor 109 goes HIGH, then the MODIFIED EST/CRANK signal is passed via AND gate 215 and either gate 223 or gate 225 passes the CRANK signal onto CRANK OUT conductor 115 in accordance with the state of flip flop 149.

Figure 5:
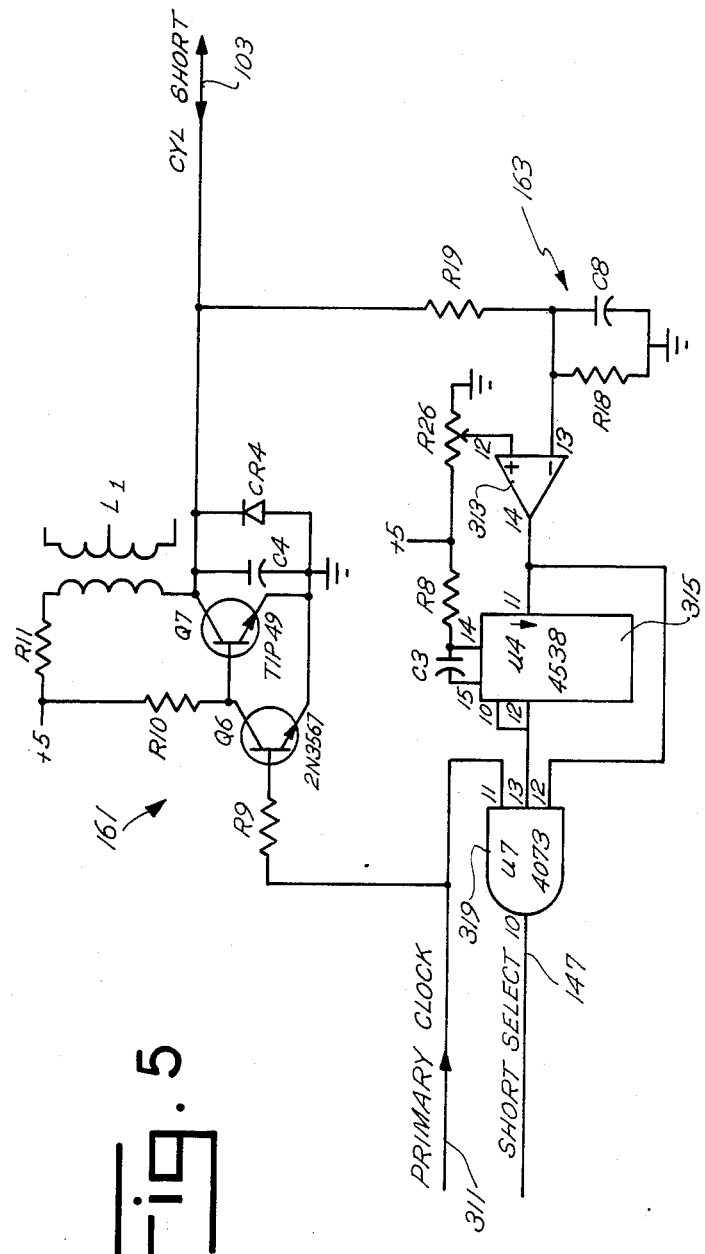
FIG. 5 is an electrical schematic diagram of the power balance command logic of the interface of FIG. 1.

Referring to FIG. 5, a preferred circuitry for power balance command logic 133 is shown. The PRIMARY CLOCK signal appears on an input conductor 311 and is fed to primary signal generator 161. Generator 161 is comprised of a pair of transistors Q6, Q7, resistors R9, R10, R11, a capacitor C4, a diode CR4 and a transformer L1. Signal generator 161 serves to generate a large 100 volt spike to generate a fake primary pattern as an output onto cylinder short conductor 103. Analyzer 93 sense the primary spike prior to shorting lead 103.

Cylinder short conductor 103 is driven low by engine analyzer 93 in order to short the firing of next cylinder to be fired in time. Voltage sensor 163 includes a voltage divider formed of resistors R19, R18 which serves to provide a voltage indicating that engine analyzer 93 is instructing that the next cylinder in sequence be inhibited from firing. A capacitor C8 serves as a low pass filter to eliminate spurious noise signals.

An op amp 313 monitors the voltage developed by resistors R18, R19 in comparison with a threshold voltage developed across a resistor R26. Op amp 313 fires a monostable multivibrator 315 when test lead 103 is shorted, for generating a SHORT SELECT signal onto conductor 317.

Monostable multivibrator 315 includes a time constant formed from resistor R8 and capacitor C3 for establishing the duration of the SHORT SELECT signal pulse. The SHORT SELECT pulse is gated by an AND gate 319 at the proper time to permit the MODIFIED EST/CRANK signal to gate through gates 215, 221 (FIG. 4). The SHORT SELECT signal sets flip flop 149 (FIG. 4) to gate the MODIFIED EST/CRANK signal.

The time of gating of AND gate 319 is controlled by the PRIMARY CLOCK signal which is input to AND gate 317. Also input to AND gate 317 is the output of op amp 313, which represents the time of shorting of lead 103 by the CYL SHORT signal developed by analyzer 93.

Referring again to FIG. 1, ignition system interface 105 includes a secondary pattern processor 701. Processor 701 receives secondary signals along conductors 117, 119 for developing a secondary pattern signal output onto conductor 721 to engine analyzer 93.

Figure 6:
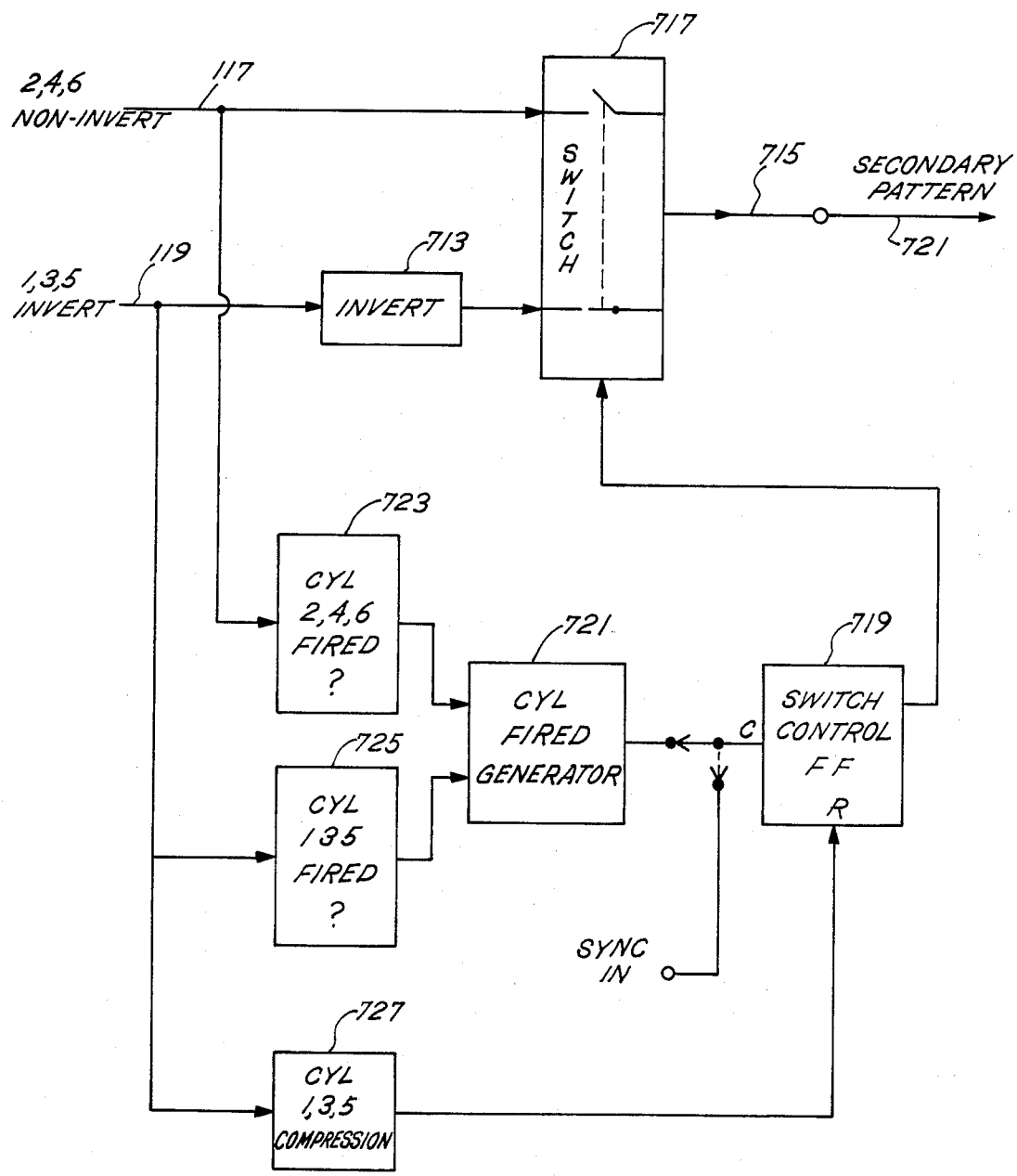
FIG. 6 is a block diagram of the secondary pattern processor of the interface of FIG. 1.

Referring to FIG. 6, secondary pattern processor 701 (shown in more detail) receives both positive and negative secondary patterns of the spark plugs along input conductors 117, 119. A capacitor clamp (not shown) is clamped around the spark plug wires for the No. 2, 4 and 6 plugs and picks up the negative voltage firing signals for input onto conductor 117. A second capacitive clamp (not shown) is clamped around the spark plug wires for the No. 1, 3 and 5 plugs and picks up the positive voltage firing signals for input onto conductor 119.

The positive patterns are inverted by an inverter 713 and then summed with the negative patterns onto a conductor 715 for generating a usable secondary pattern signal which is output to engine analyzer 93 via test lead 721. A switch 717 is utilized to pass the input signal appearing on conductor 117 or the inverted input signal appearing on conductor 119, depending upon whether the signal occurs in the compression mode. That is, when the cylinder No. 1 is fired, the cylinder No. 4 is also fired. Thus, a signal will appear on both conductors 117, 119 simultaneously. When the No. 1 cylinder is fired in the compression mode, the inverted signal on conductor 119 is passed onto conductor 715 by switch 717. When the No. 1 cylinder is fired in the exhaust mode, switch 717 instead passes the signal on conductor 117 (the No. 4 cylinder firing in the compression mode) onto conductor 715.

A switch control flip flop 719 serves to actuate switch 717 for proper synchronization of the secondary signals. Flip flop 719 is toggled to change the position of switch 717 by a cylinder fired generator 721. Generator 721 is actuated to generate a clock pulse whenever a cylinder is fired. A pair of firing determination circuits 723, 725 serve to monitor the inputs on conductors 117, 119, respectively, for producing a pulse output whenever a cylinder is fired.

In order to begin the toggling of flip flop 719 at the proper time, a 1-3-5 cylinder monitoring circuit 727 generates an output pulse to the reset input of flip flop 719. One-3-5 cylinder monitoring circuit 727 generates an output whenever the No. 1 or 3 or 5 cylinder is fired in its compression mode.

Figure 7:
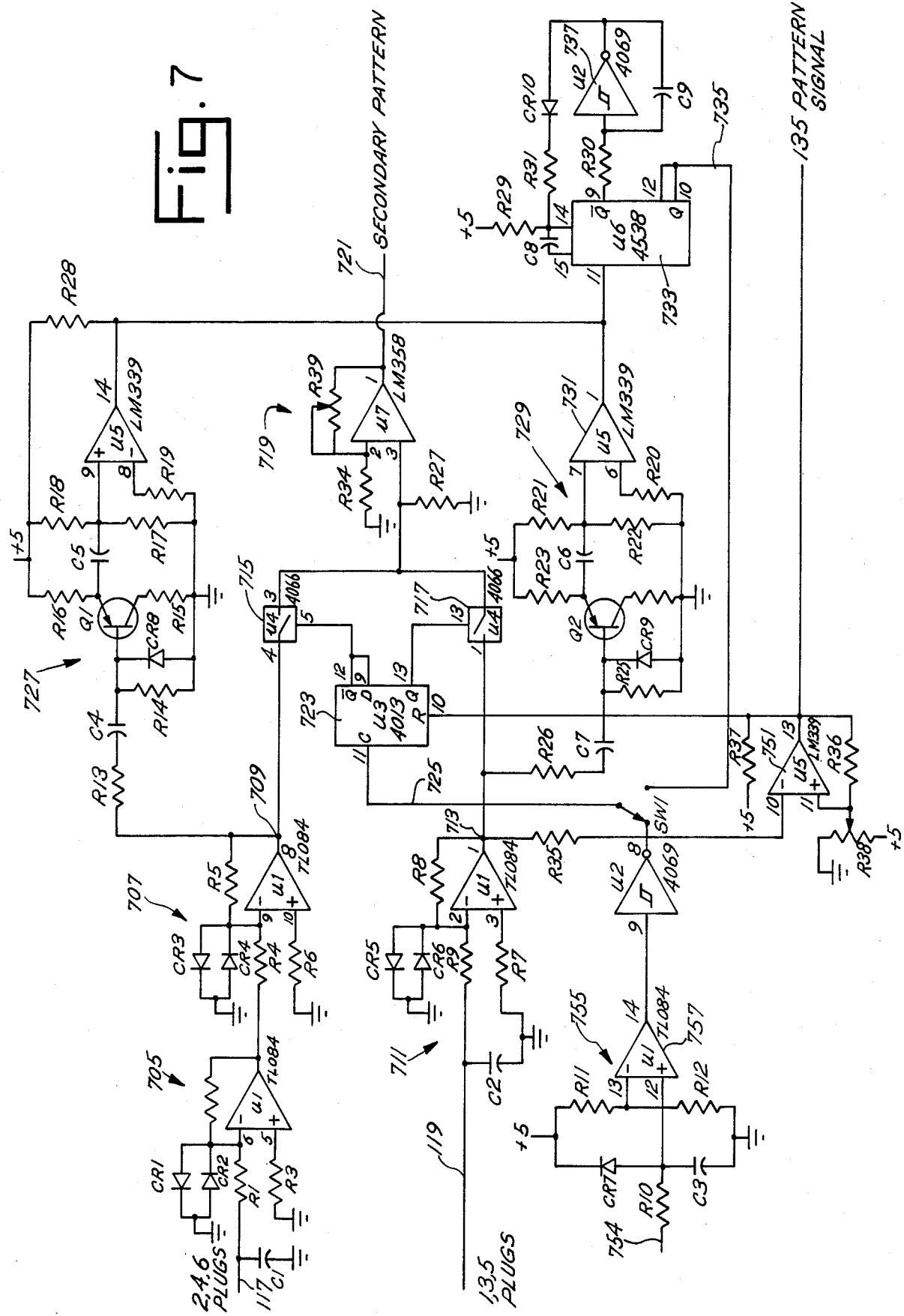
FIG. 7 is an electrical circuit schematic of the secondary pattern processor of FIG. 6.

Referring to FIG. 7, input conductors 117, 119, receive secondary input pattern signals. The secondary pattern appearing on conductor 117 is inverted by an inverter circuit 705 and then inverted again by a second inverter circuit 707 providing the secondary pattern at node 709. The secondary pattern appearing on conductor 119 is inverted by a conventional inverter 711 providing the inverted pattern at node 713. Thus, the inverters 705-711 serve to place the secondary patterns in their normally negative wave patterns for transmission to analyzer 93.

The inverters 705, 707, 711 are conventional signal inverting circuits formed of an op amp, three resistors and 2 diodes connected as shown. Capacitors C1, C2 serve as input noise filtering capacitors, as understood.

The patterns appearing at nodes 709, 713 are passed through C-MOS switches 715, 717 through a conventional gain amplifier 719 and then onto the secondary pattern lead 721 connected to engine analyzer 93.

C-MOS switches 715, 717 are switched so that only the firing signal occuring at the compression mode of the cylinder passes to analyzer 93. A flip flop 723 controls the C-MOS switches for selecting only the cylinder firings in the compression mode. Flip flop 723 has its Q and $\bar{Q}$ output connected directly to C-MOS switches 715, 717 for controlling the switch position of the switches in accordance with the outputs of flip flop 723.

Flip flop 723 is toggled by a clock signal appearing at its clock input on conductor 725. In order to generate the clock input on conductor 725, the signals appearing at nodes 709, 713 pass through like circuitry 727 and 729, respectively, which senses the leading edge of the firing of each plug. In circuitry 729, capacitor C7 and resistor R26 senses the first large voltage swing at node 713. Capacitor C7 differentiates the waveform to obtain a front edge spike. The negative voltage spike serves to turn Q2 on pulling resistor R23 to R24 which effects the bias on pin 7 of comparator 731. This fires comparator 731. Comparator 731 is an open collector comparator such that when it fires, it pulls its output to ground. Circuit 727 includes like components and operates similar to circuit 729.

The falling edge at the output of comparator 731 changes the voltage at the input of a monostable multivibrator 733 as developed by a resistor R28. This fires multivibrator 733 for generating a clocking signal onto a conductor 735. The generated clocking signal on conductor 735 is fed to the clock input of flip flop 723 via a switch SW1.

The time constant of multivibrator 733 is determined by capacitor C8 and resistor R29. However, this time constant is changed as engine speed becomes faster. Initially, a wide time constant occurs at a slow speed and then narrows as the speed increases. A feedback circuit comprising inverter 737, resistors R30, R31, capacitor C9 and diode CR10, serve to vary the effective resistance in the time constant. The feedback circuit serves to supply extra current to charge capacitor C8 at a faster rate to obtain a narrower time constant. Pin 9 of multi-vibrator 733 is normally high and then goes low for the period of the time constant. As the speed of the engine increases, the monostable 733 is fired more often and the off time increases which causes inverter 737 to stay on for a longer period of time. C9 integrates the voltage to produce a DC voltage to charge capacitor C8.

The output signal of multivibrator 733, which appears on conductor 735, is a pulse occurring every time a cylinder fires. This serves to toggle flip flop 723. However, in order to synchronize the toggling of flip flop 723 with the No. 1 cylinder, a comparator 751 receives the waveform appearing at node 713 for resetting flip flop 723 on the 1, 3, 5 cylinder firings of the compression mode.

The voltage appearing on conductor 119 is quite low during the firing of a plug in the exhaust mode, as compared to its voltage at the firing in the compression mode. Therefore, comparator 751 is used to distinguish the compression mode firing. Comparator 751 compares the voltage at 713 with a threshold voltage developed by resistors R36, R38. Whenever the signal appearing at node 713 exceeds the threshold voltage, the output of comparator 751 is driven HIGH indicating that the No. 1, 3, 5 plug is firing in the compression mode.

In certain types of automotive engines having electronic controlled ignition timing, a tachometer terminal is available which provides a pulse every time a cylinder fires at the beginning of ignition firing. A circuitry 755 has its input 754 connected to such a tach terminal. Capacitor C3 filters any noise appearing on the tachometer's signal and diode CR7 and resistor R10 clip the 12-volt input signal to a 5-volt signal. Resistors R11 and R12 provide a voltage threshold to op amp 757. When the voltage appearing at the noninverting input of op amp 757 goes high, the voltage will exceed the voltage appearing at the inverting input of op amp 757. The op amp's output responsively goes high providing a toggle pulse to the clock input of flip flop 723. Switch SW1 is manually actuated for making use of the tachometer terminal.

Figure 8:
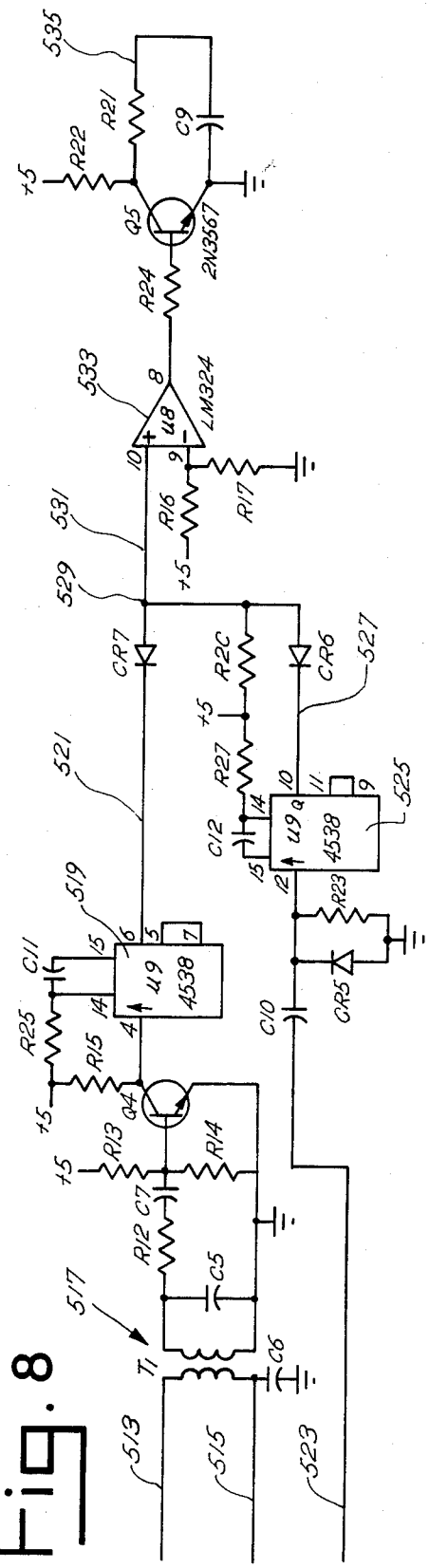
FIG. 8 is an electrical circuitry diagram of the CYL No. 1/engine sync processor of the interface of FIG. 1.

Referring to FIG. 8, cylinder No. 1/engine sync processor 801 is shown in more detail. A cylinder No. 1 trigger clamp (not shown) is connected to the No. 1 spark plug wire and picks up the firing signal of the No. 1 plug. The firing signal is input across conductors 513, 515. Each time plug No. 1 is fired (at compression and at exhaust), a voltage is developed between conductors 513, 515.

A one-to-one transformer 517 transforms the firing voltage on conductors 513, 515 causing a negative voltage drop across a capacitor C5. The voltage across capacitor C5 is differentiated through a capacitor C7 to provide a negative voltage spike at the base of a transistor Q4.

Transistor Q4 is normally biased on by a voltage divider R13, R14. Each time the negative voltage spike is developed at the base of transistor Q4, the transistor turns off.

The turning off of transistor Q4 actuates a monostable multivibrator 519 for developing an output pulse onto a conductor 521. The output pin 6 of the monostable 519 goes HIGH for a time period determined by resistor R25 and capacitor C11. This circuit serves to decrease the sensitivity of the circuit due to noise in the system. Thus, the signal appearing on conductor 521 is representative of the firing of the No. 1 plug.

A second input conductor 525 receives the 1-3-5 PATTERN signal developed by op amp 751 from the secondary pattern processor 701 (FIG. 7). Each time the No. 1, 3, 5 cylinder plug is fired on the compression stroke, the 1-3-5 PATTERN signal along conductor 523 goes HIGH, firing a monostable multivibrator 525. The duration of the output pulse on pin 10 of monostable 525 is determined by a resistor R27 and a capacitor C12. The output of multivibrator 525 is developed on a conductor 527. Conductors 521, 527 are connected at a circuit node 529 via diodes CR6, CR7. The signals on conductors 521, 527 are ANDed together at node 529 such that the output on a conductor 531 is the firing of the No. 1 plug during the compression cycle. This is because conductor 521 goes HIGH at the firing of the No. 1 and the No. 4 plugs, and conductor 527 goes HIGH on the firing of the No. 1, No. 3 and No. 5 plugs.

An op amp 533 squares up the signal appearing on conductor 531 and provides enough drive current for an output transistor driver Q5. When Q5 turns on, capacitor C9 discharges rapidly providing a surge of current in trigger loop 535. A clamp from analyzer 93 which is normally hooked to the No. 1 plug is hooked to the trigger loop 535 for providing information to engine analyzer 93 that the No. 1 plug has been fired.

It is to be understood, of course, that the foregoing describes a preferred embodiment of the present invention and that modifications may be made therein without departing from the spirit or scope of the present invention as set forth in the appended claims.

What is claimed is:

1. For use with a test engine analyzer to analyze a computer controlled automotive engine having an electronic control module which develops timing signals to a coil ignition module which fires the spark plugs of the engine, the timing signals carrying dwell information, an interface, comprising:
    input means for receiving timing signals from the electronic control module;
    output means for transmitting timing signals to the coil ignition module;
    cylinder clock modification circuitry for receiving said timing signals from said input means and for passing timing signals to said output means, said cylinder clock modification circuitry generating a modified timing signal in response to an inhibit command signal for transmission to said coil ignition module, said modified timing signal carrying dwell information of a dwell period insufficient to fire a spark plug; and
    power balance command circuitry for receiving a cylinder inhibit command from said engine analyzer and responsively generating a said inhibit command signal, whereby a cylinder of the engine is inhibited from firing.

2. An interface according to claim 1 wherein said cylinder clock modification circuitry includes gating logic means responsive to said inhibit command signal for gating said modified timing signal to said output means.

3. An interface according to claim 2 wherein said gating logic means receives said timing signals from said input means and gates said timing signals to said output means in the absence of a said inhibit command signal.

4. An interface according to claim 3 and further including second input means for receiving a crank signal representative of the cranking of the engine; and
    second output means for transmitting a crank out signal to said coil ignition module; and
    wherein said gating logic means receives said crank signal from said second input means and gates either said modified timing signal or said crank signal to said second output means in response to the presence of said inhibit command signal.

5. An interface according to claim 4 and further including third input means for receiving a bypass signal indicating whether the coil ignition module is to be controlled by the timing signals or the crank signal; and
    wherein said gating logic means receives said bypass signal from said third input means.

6. An interface according to claim 1 wherein said power balance command circuitry includes a primary signal generator, said primary signal generator being synchronized with said timing signals from said input means for generating a high voltage primary signal to the engine analyzer.

7. An interface according to claim 6 and further including a cylinder short test lead connected between said interface and the engine analyzer;
    said interface developing said high voltage primary signal on said cylinder short test lead, and said cylinder short test lead conducting said cylinder inhibit command from said engine analyzer to said interface.

8. An interface according to claim 7 wherein said power balance command circuitry further includes voltage monitoring means for monitoring the voltage appearing on said cylinder short test lead, said voltage monitoring means generating a short select signal indicative of a cylinder inhibit command generated by the engine analyzer.

9. An interface according to claim 8 wherein said power balance command circuitry includes a gate signal generator responsive to said short select signal for generating said inhibit command signal.

10. An interface according to claim 8 wherein said short select signal is generated at a time determined by said timing signals from said input means.

11. An interface according to claim 9 wherein said cylinder clock modification circuitry includes control signal generator for generating a primary clock signal, said control signal generator receiving said timing signals and said crank signal, said control signal generator generating said primary clock signal.

12. An interface according to claim 11 wherein said gate signal generator is resettable for extinguishing said inhibit command signal, and said primary clock signal is transmitted to said gate signal generator for resetting thereof.

13. An interface according to claim 11 wherein said cylinder clock modification circuitry includes a modified dwell signal generator for generating said modified timing signal, said modified dwell signal generator being responsive to said primary clock signal for initiating generation of said modified timing signal.

14. An interface according to claim 11 and further including power balance secondary signal generator responsive to said primary clock signal for generating a power balance secondary signal, and further including a power balance secondary output means for transmitting said power balance secondary signal to said engine analyzer.

15. An interface according to claim 1 and further including:
    first secondary signal input means for receiving positive secondary signals; and
    second secondary signal input means for receiving negative secondary signals;
    secondary pattern processor means responsive to signals on said first and second secondary signal input means for generating a secondary signal pattern of a single polarity for transmission to the engine analyzer.

16. An interface according to claim 15 wherein said secondary pattern processor means further includes:
    inverter means connected to said first secondary signal input means for inverting the positive secondary signals;
    switch means for receiving secondary signals from said second secondary signal input means and for receiving inverted secondary signals from said inverter means, said switch means being controllable for passing signals from one of its inputs for generating said secondary signal pattern.

17. An interface according to claim 16 and further including switch control means connected to said switch means for synchronizing said switch means with the firing of the cylinder No. 1 spark plug.

18. An interface according to claim 17 wherein said switch control means includes a flip flop resettable by the secondary signal input on the first or second secondary signal input means associated with the No. 1 cylinder spark plug, said flip flop settable by the firing of a cylinder as indicated by the signals appearing on said first and second secondary signal input means.

19. An interface according to claim 15 and further including cylinder No. 1/engine sync processor means responsive to the cylinder No. 1 secondary signal and responsive to the signal appearing on the first or second secondary signal input means associated with cylinder No. 1 for generating a cylinder No. 1 timing signal for transmission to the engine analyzer.

* * * * *